Figure 1:
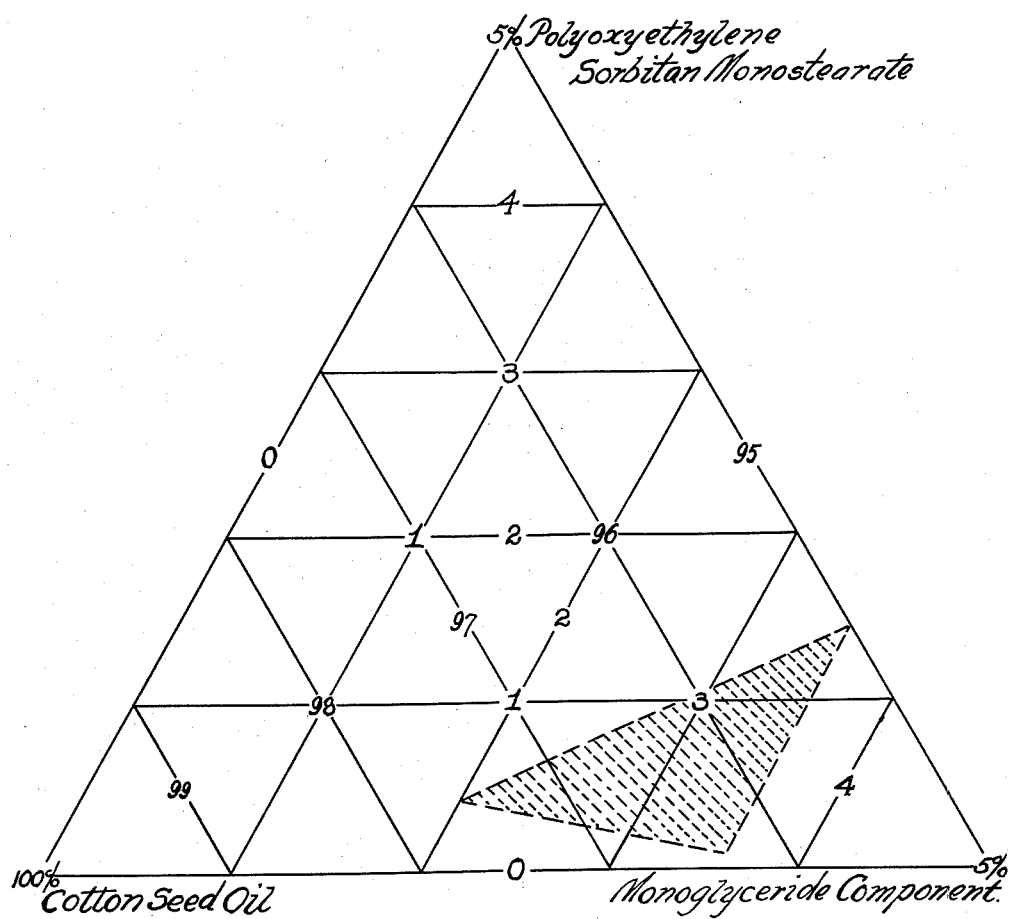

· # United States Patent Office 2,968,564
Patented Jan. 17, 1961

2,968,564

SHORTENING

William Frederick Schroeder, Memphis, Tenn., and Charles Jack Houser, Champaign, Ill., assignors to National Dairy Products Corporation, New York, N.Y., a corporation of Delaware Filed Jan. 21, 1958, Ser. No. 710,359

7 Claims. (Cl. 99—118)

The present invention relates generally to extension of the use of edible liquid oils and, more particularly, it relates to a flowable or liquid shortening made from edible liquid oils for baking, frying and other food purposes. The invention not only relates to a flowable shortening product but also is directed to processes for making and using such a product.

As is well known, many shortenings are on the market today, and have been marketed for many years, for baking and cooking purposes. The more common shortenings are plastic, or semi-solid, in character and are prepared from hydrogenated vegetable oils, such as cottonseed oil and soy bean oil. To these shortenings are frequently added so-called emulsifiers such as mono- and di-glycerides, and such shortenings are referred to as emulsifier-type shortenings. These shortenings are good for baking cakes, frying and other cooking purposes. However, such shortenings are not pourable or flowable at room temperatures, and, consequently, are measured for baking and cooking purposes with some difficulty.

Another plastic shortening of this same general type has been and is being marketed, this shortening being made by "rearrangement" of lard. This shortening has much the same advantages as the hydrogenated vegetable oils mentioned above but, at the same time, has the inherent disadvantages of the plastic shortenings.

There are various liquid shortenings which have been and are commercially available. These liquid shortenings have had several disadvantages and, in this connection, these shortenings have not provided cakes with the volume, grain structure and/or eating qualities equivalent to that provided with the use of plastic shortenings. Furthermore, some of the available liquid shortenings on the market are not storage stable and layer or separate upon standing, thereby necessitating shaking or stirring prior to use. Accordingly, while readily measurable fats have been provided by presently available liquid shortenings, they have not provided a product which can be used to make cakes which are equivalent to those made with plastic shortenings. As a result, liquid shortenings have not generally had wide acceptance.

It has sometimes been said that liquid edible oils have shortening properties. However, it is generally recognized in the baking industry that such liquid oils have substantially inferior cake making properties when compared with emulsifier-type shortenings. In addition, the cake making properties of liquid oil are less than the cake making properties of those liquid shortenings now being marketed for use in place of emulsifier-type shortenings.

Therefore, it is a main object of this invention to provide means for improving the properties of edible liquid oils, and a more particular object is the provision of an improved liquid shortening and a method for making such a shortening. It is a further object of the invention to provide a liquid shortening which does not separate into layers, thereby providing a uniform product. It is also an object of this invention to provide a liquid shortening which can be used in cakes to provide a cake having a volume, grain structure and eating qualities like cakes made from plastic shortenings. It is still another object of this invention to provide a liquid shortening product which can be used in place of emulsifier-type shortenings in various recipes and for frying, which shortening, at the same time, can be conveniently stored and handled in a liquid state.

Still further objects and advantages of the invention will become apparent by reference to the following description and the accompanying drawing, in which the figure is a ternary diagram illustrating the desired amounts of components of certain liquid shortening products of the invention.

In accordance with this invention, the shortening properties of liquid edible oil is improved by adding a surface active agent and a mono-glyceride. The liquid oil comprises from about 94 percent to about 98 percent of the liquid shortening. The mono-glyceride comprises more than about .8 percent of the liquid shortening. The mono-glyceride should be present in an amount which does not interfere with the fluidity of the shortening and, in general, will not exceed about 2.5 percent. As indicated, greater percentages of mono-glyceride limits the pourability of the shortening and higher percentages should be avoided.

The surface active agent is present in the liquid shortening in an amount from about .1 percent to about .2 percent.

The sum of the percentages of surface active agent and mono-glyceride should be in excess of about .9 percent. Generally, the sum of the percentages will not exceed about 4.5 percent if fluidity of the shortening is to be maintained.

The edible liquid oil may be cottonseed oil, peanut oil, soy bean oil and corn oil or mixtures thereof and, in general, should have an iodine value in excess of about 85 and the base oil should be substantially free from tri-saturated glyceride. The iodine value is primarily of significance to indicate the liquidity of the oil.

The liquid oil preferably has a "cold test" in excess of 5.5 hours. The cold test is a standard test in the edible oil industry and a standard method is provided by the American Oil Chemists Society. In this test an oil sample is placed in a sealed four ounce bottle which, in turn, is placed in a bath of melting ice at 32° F. The base oil used in the practice of this invention desirably remains clear at the end of 5.5 hours in the bath, i.e., have a cold test in excess of 5.5 hours. Oils having cold tests in excess of 5.5 hours have more liquidity at lower temperatures and, therefore, the cold test of more than 5.5 hours is desired.

To the liquid oil is preferably added a fluidizing agent. This agent serves to maintain the liquidity of the product of the invention, particularly at lower temperatures. The manner in which the fluidizing agent performs is not altogether understood.

The mono-glyceride which is employed in the liquid shortening of this invention may be made from various oils, fatty acids, or oil or fatty acid fractions recovered from a wide number of treatments of and processing of glyceride oils. The mono-glyceride will normally be used in the form of a product comprising mono-, di- and tri-glycerides; this mixed product being generally referred to as a mono-glyceride component. For purposes of this invention, the mono-glyceride component should comprise at least about 35 percent mono-glycerides, measured as alpha mono-glycerides.

In general, the percent of mono-glyceride required is inversely proportional to the amount of surface active agent employed. That is to say, as the amount of mono-glyceride increases, the amount of surface active agent required decreases. When the mono-glyceride component is used, the amount of surface active agent is generally inversely proportional to the amount of mono-glycerides, in the mono-glyceride component. Stated another way, as the percent of mono-glyceride in the mono-glyceride component decreases, the amount of surface active agent should increase.

The mono-glyceride should primarily comprise fatty acid radicals having more than 14 carbon atoms, and preferably should comprise a substantial portion of fatty acid radicals having 20 or more carbon atoms. The amount of surface active agent will vary inversely with the average length of carbon chain. In other words, as the average length of the fatty acid radical decreases, the amount of surface active agent will increase.

The mono-glyceride should have substantially saturated fatty acid radicals. In this connection, the mono-glyceride component should have an iodine value of less than 40 I.V. for purposes of this invention. At higher iodine values, the resulting cakes are less desirable.

By way of example, the mono-glycerides for this invention can be prepared from menhaden oil, herring oil, tallow, peanut oil, soy bean oil, cottonseed oil, and corn oil, or mixtures thereof. These oils have fatty acid chains of desired length and can be utilized in the manufacture of the mono-glycerides. However, it has been found that menhaden oil is particularly satisfactory for making mono-glycerides for this invention. This oil has a substantial number of fatty acid radicals having carbon chains 20 and 22 carbons long. In this connection, menhaden oil has about 30 percent of $C_{20}$ and $C_{22}$ carbon chains.

The surface active agent should be substantially oil soluble or, at least, form a stable suspension in oil at the levels used and may be derived from the following classes of compounds or their equivalents:

(1) Partial esters of the fatty acids with hexahydric alcohols or their anhydrides.

(2) Polyoxyalkylene derivatives of the partial esters of the fatty acids with hexahydric alcohols or their anhydrides.

(3) Ester-ethers resulting from the reaction of fatty acids with alkylene oxides.

For purposes of this specification, "surface active agent" shall mean any of the foregoing compounds or their equivalents.

Particular compounds which have provided satisfactory results include:

(1) Polyoxypropylene mannitol dioleate
(2) Polyoxyethylene sorbitan tristearate
(3) Polyoxyethylene sorbitan monooleate
(4) Sorbitan monostearate
(5) Sorbitan sesquioleate
(6) Polyoxyethylene monostearate
(7) Polyoxyethylene sorbitan monostearate As has been indicated, the amount of surface active agent should be in the range from about .1 percent to about 2 percent to provide the desired results of the invention.

As indicated before, the shortening may also include a fluidizing agent in order to promote and maintain fluidity. A most satisfactory example is an aluminum tri-soap of a higher saturated fatty acid, the fatty acid having a carbon chain of at least 16 carbon atoms. The fluidizing agent should be present in the amount which maintains fluidity of the product at about room temperatures and below, and, in general, will be present at a level in excess of about .01 percent. Amounts in excess of .3 percent do not appear to provide further improvement. A particularly satisfactory agent is alumium tri-palmitate.

Now referring to Figure 1 of the drawing, this figure is a ternary diagram of certain liquid shortenings having particular components in accordance with the invention, and illustrates the effect of varying the amount of the mono-glyceride component and the amount of surface active agent in such a system. The lower left hand corner of the diagram represents 100 percent cottonseed salad oil and the lower right hand corner of the diagram represents 5 percent of less than about 1 I.V. menhaden mono-glyceride component comprising about 42 percent alpha mono-glyceride. At the top of the diagram is 5 percent polyoxyethylene sorbitan monostearate, which is sold commercially under the trade name Tween 60.

The shaded area in the diagram represents various percentages of components which provide a satisfactory mixture of the components of this invention for providing good cake baking properties. Mixtures outside of this shaded area produce inferior liquid shortenings. In this connection, the mixtures represented by the area above the shaded area have unsatisfactory baking characteristics, as do the mixtures below and to the left of the shaded area. However, at higher precentages of the particular mono-glyceride component, represented by the area below and to the right of the shaded area, the product loses its fluid character and does not readily pour, even with the presence of the fluidizing agent.

It will be understood, within the foregoing description and discussion, that the size and shape of this shaded area will vary with the type of surface active agent and the character of the mono-glyceride employed. However, a satisfactory liquid shortening can be readily prepared by one skilled in the art within the teachings of the foregoing and in view of the accompanying drawing.

The liquid shortening of this invention may be prepared by mixing the edible liquid oil, the surface active agent and the mono-glyceride, and heating the mixture to a temperature where all of the components form a single liquid phase. The fluidizing agent may be dissolved in a portion of the liquid oil by heating and then adding it to the mixture. The mixture is agitated and is quickly cooled with high agitation to a temperature of below about 85° F. in suitable chilling equipment. This temperature is inversely related to the iodine value of the mono-glyceride component and directly related to the melting point of the mono-glyceride component. That is to say, with higher iodine value and lower melting point mono-glycerides, the shortening should be cooled to lower temperatures in the chilling equipment. A highly satisfactory piece of chilling equipment is a Votator unit manufactured by the Girdler Division of National Cylinder Gas Corporation. The product may be tempered, after cooling, at a temperature of about 85° F. for about 24 hours.

The quick chilling procedure appears to be the most satisfactory commercial procedure but satisfactory results can be obtained by passing the mixture, however cooled, through a colloid mill or equivalent equipment to make the product fluid.

The product of the invention has provided white cake volumes in excess of 1225 cubic centimeters and has provided cake batters with specific gravities of less than .85. These volumes and specific gravities are equivalent to those provided by plastic shortenings and are substantially better than those provided by available liquid shortenings. Presently available liquid shortenings provide white cake volumes of less than 1050 cubic centimeters.

The white cake test, which has been utilized in evaluating the liquid shortenings of this invention, is a somewhat standard test for evaluating emulsifier-type shortenings. This test is one of the more difficult tests for shortenings and the formula employed is for a richer type cake which contains a high proportion of sugar relative to flour.

The white cake is prepared by making a dry mix comprising the following ingredients in the stated amounts:

41.9 parts flour
52.1 parts sugar
1.0 part salt
2.5 parts baking powder

To 48.7 parts of the dry mix is added 10.0 parts of shortening and 16.0 parts of liquid, whole homogenized milk. The dry mix, shortening and milk are blended together, and to the blend is added a mix of 12.0 parts of egg white and 8.0 parts of liquid, whole homogenized milk. This complete mixture is then blended to a satisfactory batter and the batter specific gravity measured.

The batter, in an amount of 420 grams is placed in an 8 inch cake pan and is heated in an oven at 350° F. After baking, the volume is measured by a standard procedure.

*Example I*

Winterized cottonseed salad oil was mixed with 3.5 percent of a less than 1 I.V. menhaden oil mono-glyceride component comprising 42 percent alpha mono-glycerides. Polyoxyethylene sorbitan monostearate (Tween 60) was added as the surface active agent to a level of .45 percent. Aluminum tripalmitate was separately mixed with a portion of the cottonseed oil at a temperature of about 250° F. and this mixture was added to the cottonseed oil, mono-glyceride and surface active agent to provide a level of aluminum tripalmitate of .06 percent. The mixture was heated to a temperature of 180° F. so as to form a single liquid phase.

The mixture was quickly chilled to a temperature of 60° F. in a chilling unit. The product was chilled with agitation in about four minutes. The product was tempered at 85° F. for 24 hours. The resulting product remained uniform in appearance over a two month period and did not layer in the temperature range of from about 40° F. to about 105° F.

The shortening was used in preparing batter for a white cake and the batter had a specific gravity of .87. Upon baking the white cake had a volume of 1180 cubic centimeters. This is comparable to the volume of cake provided by the use of conventional plastic shortenings. The cake also had grain structure and eating qualities equivalent to cake baked with plastic shortening.

*Example II*

The same procedure was followed and proportions utilized as in the case of Example I, except that the surface active agent was polyoxypropylene mannitol dioleate. The resulting shortening was likewise baked into a white cake from a batter having a specific gravity of .99 and provided a cake volume of 1070 cubic centimeters. While this cake did not have as good properties as that provided when emulsifier type shortening is used, the cake characteristics were better than that provided by presently available liquid shortenings. Cottonseed oil gave a cake batter having a specific gravity of 1.11, the cake having a volume of 940 cubic centimeters. Two commercially available liquid shortenings gave batters having specific gravities of 1.05 and 1.13, which gave cakes having volumes of 1040 and 935 cubic centimeters.

*Example III*

The same procedure was followed and proportions used in making the liquid shortening of this example as in the case of Example I, except that the surface active agent employed was polyoxyethylene sorbitan tristerate. The resulting liquid shortening was employed in the baking of a white cake from a batter having a specific gravity of .90 and the cake had a volume of 1105 cubic centimeters.

*Example IV*

Again, the same procedure and proportions set forth in Example I were employed in making this liquid shortening but the surface active agent was polyoxyethylene sorbitan monooleate. The resulting liquid shortening was baked in a white cake made from batter having a specific gravity of .99 and the cake volume was 1070 cubic centimeters.

*Example V*

The same procedure and proportions were employed in this example as in the case of Example I, except that the surface active agent was sorbitan monostearate. The resulting liquid shortening was used in the baking of a white cake and the cake had a volume of 1170 cubic centimeters. The batter had a specific gravity of .85.

*Example VI*

The same procedure and proportions as in Example I were utilized in making this liquid shortening except that the surface active agent was sorbitan sesquioleate. The liquid shortening provided was used in a batter which had a specific gravity of .95 and gave a white cake volume of 1105 cubic centimeters.

*Example VII*

The same procedure and proportions specified in Example I were utilized in making this liquid shortening but the surface active agent employed was polyoxyethylene monostearate. The batter had a specific gravity of .94 and the resulting white cake had a volume of 1105 cubic centimeters.

*Example VIII*

The same procedure and proportions were utilized as in the case of Example I except that a commercially available mono-glyceride mixture was employed, this mixture being sold under the trade name Atmul 84. The mixture had less than 1 I.V. and is prepared from beef fat. It comprised 44 percent alpha mono-glyceride. The liquid shortening was made into a white cake batter which had a specific gravity of .87 and provided a cake volume of 1150 cubic centimeters.

*Example IX*

The same procedure and proportions were utilized as in the case of Example I except that the mono-glycerides were prepared from peanut oil having less than 1 I.V. and the surface active agent was used at a level of .40 percent. The mono-glyceride component comprised about 42 percent of alpha mono-glyceride. A white cake batter prepared from this liquid shortening had a specific gravity of .93 and the resulting white cake had a volume of 1110 cubic centimeters.

*Example X*

The same procedure was followed and proportions utilized in preparing the liquid shortening of this example as in the previous example except that the mono-glyceride component was prepared from soy bean oil having less than 1 I.V. The liquid shortening was made into a white cake batter which had a specific gravity of .94 and provided a cake having a volume of 1070 cubic centimeters.

*Example XI*

In this example, liquid shortening was prepared with the same components and in the same manner as specified in Example I. However, the mono-glyceride component comprised 2 percent of the mixture and the surface active agent comprised .40 percent of the mixture. The batter including this mixture had a specific gravity of .96 and gave a cake volume of 1050 cubic centimeters.

*Example XII*

The same procedure was followed in preparing the liquid shortening of this example as in Example I except that the mono-glyceride component comprised 3 percent of the mixture and the surface active agent comprised .4 percent of the mixture. The resulting white cake had a volume of 1130 cubic centimeters, the batter having had a specific gravity of .86. The cake had excellent characteristics.

*Example XIII*

The same procedure is followed in preparing the liquid shortening of this example and the same components are utilized as in the case of Example I except that the mono-glycerides are made from 35 I.V. menhaden oil. The cake resulting from utilization of this liquid shortening has a satisfactory volume.

The mono-glycerides alone, even though made from 0 I.V. oils having long chain fatty acid radicals, will not provide a low specific gravity batter and will only provide a cake having a volume of about 1000 cubic centimeters. Likewise, the surface active agents alone in edible liquid oil do not provide a commercially feasible liquid shortening because of their very limited area of usefulness. Nevertheless, the components of this invention combine together in a synergistic manner to provide the highly satisfactory results of this invention.

It will be appreciated, of course, that the shortening properties of liquid oil may be improved by the presence of the ingredients of the liquid shortening of this invention in cake formulae and that the ingredients are not necessarily premixed before addition to the other cake ingredients. In other words, it is contemplated that the various ingredients of the liquid shortening may be added in various combinations in cake preparation.

It will be understood, of course, that various coloring agents may be added to the liquid shortening of this invention to provide a desired color. In this connection, beta carotene may be added for coloring purposes. Such coloring may be added to provide the desired color level and a satisfactory color may be provided by adding .0006 percent beta carotene.

It will also be understood that various antioxidants or stabilizers can be added to protect the liquid shortening. Such stabilizers are well known to those familiar with the art and protect the oil from deteriorating in flavor and quality. A highly satisfactory stabilizer is sold under the trade name of Tenox VI. It has been found that a level of .07 percent will provide the desired stability to the liquid shortening product of this invention.

The liquid shortening of this invention provides highly satisfactory cakes and it does not separate into layers upon standing for extended periods of time. The shortening is readily measurable and can be used for frying and in place of emulsifier type shortenings in various recipes and for various cooking purposes.

The various features of the invention which are believed to be new are set forth in the following claims.

We claim:

1. The combination of an edible liquid oil, a surface active agent comprising at least one compound selected from the group consisting of partial esters of fatty acids with hexahydric alcohols or anhydrides thereof, po.y-oxyalkylene derivatives of the partial esters of fatty acids with hexahydric alcohols or anhydrides thereof and ester-ethers resulting from the reaction of fatty acids with alkylene oxides, and a mono-glyceride component; said oil having an iodine value in excess of about 85 and being substantially free of tri-saturated components, said surface active agent being present in an amount between about .1 and about 2.0 percent, said mono-glyceride component having an iodine value of less than 40, the mono-glycerides in said mono-glyceride component primarily comprising fatty acid radicals having more than 14 carbon atoms, said mono-glycerides being present in an amount of at least about .8 percent and not more than about 2.5 percent.

2. The combination of an edible liquid oil, a surface active agent comprising at least one compound selected from the group consisting of partial esters of fatty acids with hexahydric alcohols or anhydrides thereof, polyoxyalkylene derivatives of the partial esters of fatty acids with hexahydric alcohols or anhydrides thereof and ester-ethers resulting from the reaction of fatty acids with alkylene oxides, and a mono-glyceride component; said liquid oil having an iodine value in excess of about 85 and being substantially free of tri-saturated components, said surface active agent being present in an amount between about .1 and 2.0 percent, said mono-glyceride component having an iodine value of less than 40, the mono-glycerides in said mono-glyceride component primarily comprising fatty acid radicals having more than 14 carbon atoms, said mono-glycerides being present in an amount of between about .8 and about 2.5 percent, the sum of the percentages of said surface active agent and said mono-glyceride being between about .9 and about 4.5 percent.

3. The combination of an edible liquid oil, a surface active agent comprising at least one compound selected from the group consisting of partial esters of fatty acids with hexahydric alcohols or anhydrides thereof, polyoxyalkylene derivatives of the partial esters of fatty acids with hexahydric alcohols or anhydrides thereof and ester-ethers resulting from the reaction of fatty acids with alkylene oxides, and a mono-glyceride component; said oil having an iodine value in excess of about 85 and being substantially free of the tri-saturated components, said surface active agent being present in an amount between about .1 and about 2.0 percent, said mono-glyceride component having an iodine value of less than 40, the mono-glycerides in said mono-glyceride component being present in an amount of between about .8 and about 2.5 percent, the mono-glycerides in said mono-glyceride component primarily having fatty acid radicals with carbon chains of 16 and longer.

4. A liquid shortening comprising an edible liquid oil, a surface active agent comprising at least one compound selected from the group consisting of partial esters of fatty acids with hexahydric alcohols or anhydrides thereof, polyoxyalkylene derivatives of the partial esters of fatty acids with hexahydric alcohols or anhydrides thereof and ester-ethers resulting from the reaction of fatty acids with alkylene oxides, and a mono-glyceride component; said liquid oil having an iodine value in excess of about 85 and being substantially free of tri-saturated components, said surface active agent being present in an amount between about .1 and 2.0 percent, said mono-glyceride component having an iodine value of less than 40, the monoglycerides primarily comprising fatty acid radicals having more than 14 carbon atoms, said mono-glycerides in said mono-glyceride component being present in an amount of between about .8 and about 2.5 percent.

5. A liquid shortening comprising an edible liquid oil, a surface active agent comprising at least one compound selected from the group consisting of partial esters of fatty acids with hexahydric alcohols or anhydrides thereof, po.yoxyalkylene derivatives of the partial esters of fatty acids with hexahydric alcohols or anhydrides thereof and ester-ethers resulting from the reaction of fatty acids with alkylene oxides, a mono-glyceride component and an edible fluidizing agent for said shortening; said oil having an iodine value in excess of about 85 and being substantially free of the tri-saturated components, said surface active agent being present in an amount between about .1 and about 2.0 percent, said mono-glyceride component having an iodine value of less than 40, the mono-glycerides in said mono-glyceride component being present in an amount between about .8 and about 2.5 percent, the mono-glycerides in said mono-glyceride component primarily having fatty acid radicals with carbon chains of 16 and longer.

6. A liquid shortening comprising an edible liquid oil, a surface active agent comprising at least one compound selected from the group consisting of partial esters of fatty acids with hexahydric alcohols or anhydrides thereof, polyoxyalkylene derivatives of the partial esters of fatty acids with hexahydric alcohols or anhydrides thereof and ester-ethers resulting from the reaction of fatty acids with alkylene oxides, a mono-glyceride component and an edible fluidizing agent for said shortening; said oil having an iodine value in excess of about 85 and being substantially free of the tri-saturated components, said surface active agent being present in an amount between about .1 and about 2.0 percent, said mono-glyceride component having an iodine value of less than 40, the mono-glycerides in said mono-glyceride component being present in an amount between about .8 and about 2.5 percent, the mono-glycerides in said mono-glyceride component primarily having fatty acid radicals with carbon chains of 16 and longer, said fluidizing agent comprising an aluminum trisoap of a higher saturated fatty acid having a carbon chain of at least 16 carbon atoms.

7. A liquid shortening comprising an edible liquid oil, a surface active agent comprising at least one compound selected from the group consisting of partial esters of fatty acids with hexahydric alcohols or anhydrides thereof, polyoxyalkylene derivatives of the partial esters of fatty acids with hexahydric alcohols or anhydrides thereof and ester-ethers resulting from the reaction of fatty acids with alkylene oxides, a mono-glyceride component and an edible fluidizing agent for said shortening; said oil having an iodine value in excess of about 85 and being substantially free of the tri-saturated components, said surface active agent being present in an amount between about .1 and about 2.0 percent, said mono-glyceride component having an iodine value of less than 40, the mono-glycerides in said mono-glyceride component being present in an amount between about .8 and about 2.5 percent, the mono-glycerides in said mono-glyceride component primarily having fatty acid radicals with carbon chains of 16 and longer, said fluidizing agent comprising aluminum tri-palmitate in an amount in excess of about .01 percent.

References Cited in the file of this patent

UNITED STATES PATENTS

| | | |
|---|---|---|
| 2,418,668 | Royce | Apr. 8, 1947 |
| 2,746,868 | Cross et al. | May 22, 1956 |
| 2,815,286 | Andre et al. | Dec 3 1957 |
| 2,864,703 | Schulman | Dec 16, 1958 |